United States Patent [19]

Le Bon

[11] 3,957,560

[45] May 18, 1976

[54] METHOD OF CEMENTING TOGETHER THE CAP, BODY, AND STEM OF ELECTRICAL INSULATORS

[75] Inventor: Georges Le Bon, Saint-Yorre, France

[73] Assignee: Compagnie General d'Electro Ceramique — Ceraver, France

[22] Filed: July 22, 1970

[21] Appl. No.: 57,060

[30] Foreign Application Priority Data

July 25, 1969 France .............................. 69.25573

[52] U.S. Cl. .............................. 156/293; 174/182; 264/DIG. 54

[51] Int. Cl.$^2$ .............................. B29C 19/00

[58] Field of Search .............. 264/DIG. 54; 156/293, 156/47, 89, 310, 98; 174/182, 189, 196; 29/631

[56] References Cited

UNITED STATES PATENTS

| | | | |
|---|---|---|---|
| 1,170,287 | 2/1916 | Lapp | 174/189 UX |
| 1,360,896 | 11/1920 | Greighton | 264/DIG. 54 |
| 1,446,067 | 2/1923 | Reagan | 174/196 UX |
| 1,816,023 | 7/1931 | Osborne | 264/DIG. 54 |
| 1,925,211 | 9/1933 | Smith | 174/196 UX |
| 2,010,934 | 8/1935 | Smith | 156/293 |
| 2,173,292 | 9/1939 | Austin | 174/189 |
| 3,024,303 | 3/1962 | Smothers et al. | 174/189 |

*Primary Examiner*—Stephen C. Bentley
*Assistant Examiner*—Harold Tudor
*Attorney, Agent, or Firm*—Pennie & Edmonds

[57] ABSTRACT

Method of cementing together the cap, body and stem portions of electrical insulators, comprising introducing measured quantities of water and cement into the cavities of the cap and body, mixing the ingredients within the cavities and immediately assembling the aforesaid portions into a complete article. The method is particularly useful in production line procedures of producing insulators.

9 Claims, 2 Drawing Figures

INVENTOR
GEORGES Le BON

BY *Bauer and Seymour*
ATTORNEYS

METHOD OF CEMENTING TOGETHER THE CAP, BODY, AND STEM OF ELECTRICAL INSULATORS

BACKGROUND OF THE INVENTION

Electrical insulators of the type involved are conventionally formed by assembling and permanently securing together, a body portion of dielectric ceramic material, a metallic cap fitting over and about the hollow body portion, and a metallic stem having one end fixed within the cavity of the body and extending therefrom. The protruding end of the stem is enlarged to fit a correspondingly-shaped recess in the outer end of the cap of a contiguous insulator so that when desired, a string of such insulators may be separably assembled in aligned relation.

The cap and its stem may be rigidly attached to the dielectric body in various ways, the usual procedure being by a seal of mortar. The mortar is prepared by mixing cement with water in suitable proportions and which, before setting, is introduced into the respective cavities of the cap and body portion. The cap is then positioned over and about the body and one end of the stem is inserted into the mortar in the cavity of the body. The parts are then maintained in proper relation in a suitable jig or mounting apparatus until the mortar hardens.

Alternatively the mortar containing the correct amount of water, may be pre-mixed, then added to the interstices between the insulator parts while these parts are held by jig means in their correct centralized relation. Advantageously the mortar may be vibrated not only during mixing but also after emplacement between the parts being permanently connected.

The prior art procedures above outlined all have the same drawback, namely, that the mortar is not added to the cavities of the insulator parts until after it has been mixed. Thus there is an unavoidable loss of time which prevents adaptation to continuous production line operations. Such procedures also result in a partial setting of the mortar before the parts can be brought into assembled relation.

SUMMARY OF THE INVENTION

The present invention overcomes the foregoing drawbacks by providing a process of cementing the insulator parts, which is readily adaptable to a continuous or production line operation by apparatus, and which, moreover, imparts added mechanical strength to the completed insulators. In general the method consists in the introduction directly into the cavities of the body and cap, of accurately measured quantities of water and cement. The water and cement are then immediately converted into homogenous mortar by means of vibration or other agitation while in the aforesaid cavities.

The method is effected facilely in a continuous procedure by moving the caps and dielectric bodies on a conveyor, past stations where correct, precisely-measured quantities of water, cement and possibly other ingredients are sequentially added, then translated past other stations where the ingredients in each cavity are mixed, as by vibration. Each cap, insulator body and stem are then sequentially assembled together into a complete insulator.

The inventive method has the advantage that the parts, namely, the body, cap and stem are assembled almost immediately after mixture of the mortar. As is well known, the plasticity of such mortar develops very rapidly after mixing. This is especially true if the mortar contains a high proportion of cement. Then the mortar quickly begins to set because of the formation of crystals which develop rapidly between the particles of cement.

As a result the prior art procedures as above outlined were not wholly satisfactory because the mortar is already partially set by the time the parts are brought into assembled relation, so that the resulting bond effected by the mortar was necessarily imperfect. Thus when, in accordance with the present invention the parts are assembled substantially simultaneously with mixing of the mortar, there is a decided improvement in the mechanical strength of the bond between the parts because they are already assembled at the instant setting of the mortar commences. Thus the drawback of pre-crystallization is avoided.

Further it is known that the aluminous type cement usually employed for securing the insulator parts together, crystallizes differently in accordance with the ambient or existing temperature. Above about 23° C. (73.4°F.) such cements form cubic crystals which possess only mediocre mechanical strength. On the other hand when setting takes place below about 23° C. the cement hardens in a hexagonal system having improved mechanical strength. Since, in accordance with the invention there is no hiatus between mixing and emplacement, the proper temperature for optimum strength can be accurately controlled and the possibility of strength impairment otherwise inherently present, is obviated.

Another decided advantage of the invention is that the quantity of ingredients, eg., cement, water, etc., introduced into each cap and body portion can be measured with great precision. Thus the level of the surface of the mortar in each assembled article is exactly the same and all are known to have the same mechanical strength. Further, since the level of the mortar affects the radiophonic perturbations of any given insulator, the invention enables such perturbations to be maintained at a minimum by pre-selection of the measured quantities of mortar ingredients added to each cavity.

A further advantage is that since a known prescribed quantity of cement is directly introduced into each insulator part, there is no spillage or wastage thereof as there unavoidably is in prior art procedures. Thus the invention results in a very real saving of cement; and since there is no spillage, the added cost of subsequent washing, scraping or other treatment of the assembled parts to remove excess mortar is likewise obviated.

It will also be apparent that because the mixing of the cement and water is effected immediately prior to assembly of the parts, all insulators formed in any given run have mortar of the same proportions of ingredients, and strength. This is in contrast to prior art procedures wherein the quality or strength of the mortar may vary from one insulator to the next, due to the fact that different batches of mortar may be used, while the time between emplacement of the mortar and assembly of the parts may vary.

I have found further that it is advantageous to introduce the prescribed amount of water in two sequentially-added portions, the cement being added between the two parts of water. In this way dispersal of cement dust and powder into the ambient air is avoided, as is possible where the cement is added lastly. Further, if the cement is added first, that is, before the prescribed quantity of water, it is difficult to obtain a complete uniform mixture of the cement located in the base of the cavities and in contact with the walls thereof.

In the preferred procedure the cement is mixed within the cavities of the cap and insulator body by mechanical agitation as by vibration. For instance I may use a device comprising needles or mixer blades which are lowered to a position immersed in the incipient mixture. The blades or needles may be oscillated or vibrated or, alternatively, rotated.

DESCRIPTION OF THE PREFERRED EMBODIMENT

Figure 1:
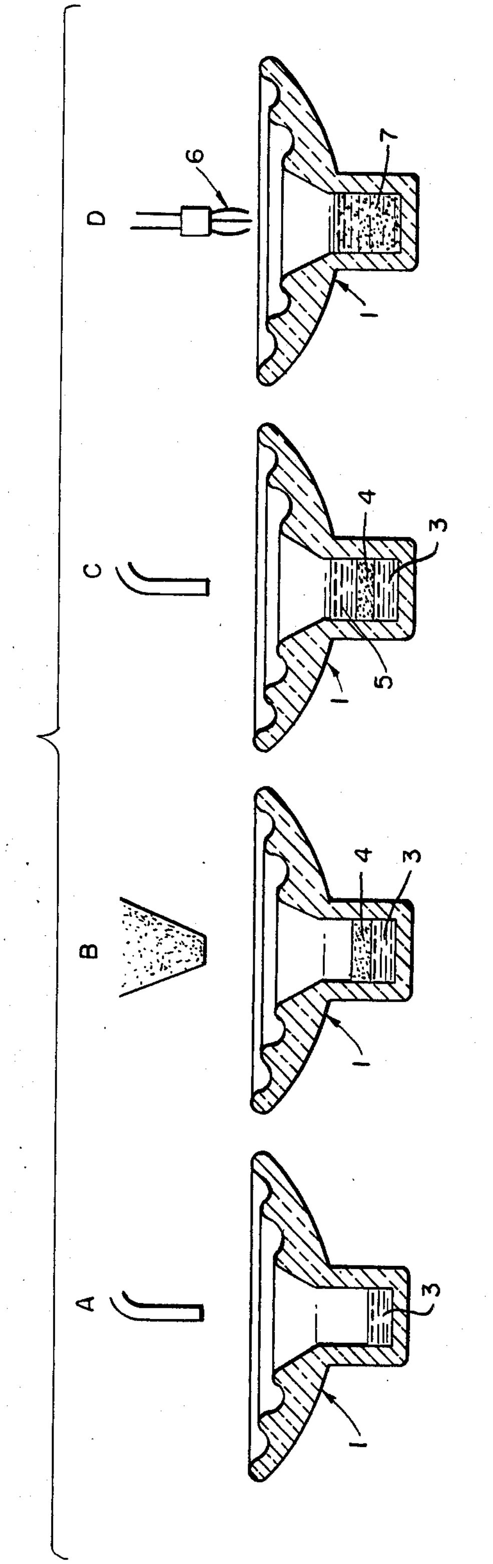
FIG. 1 shows schematically four sequential steps involved in carrying out the preparation of the mortar within the insulator body.

Referring to FIG. 1, at station A, insulator 1 is moved by conveyor means not shown, to a location where a quantity of water 3 is deposited into the cavity thereof. For example the water introduced at this station may amount to ⅓ of the total prescribed quantity. At station B there is deposited a quantity 4 of cement powder, the total prescribed amount being added at this station.

At station C there is added the residual ⅔ of water 5, and at station D the prongs or needles 6 are lowered into the ingredients within the body cavity and subjected to rotation, oscillation or vibration to rapidly mix the ingredients into mortar of essentially perfect homogeneity.

Figure 2:
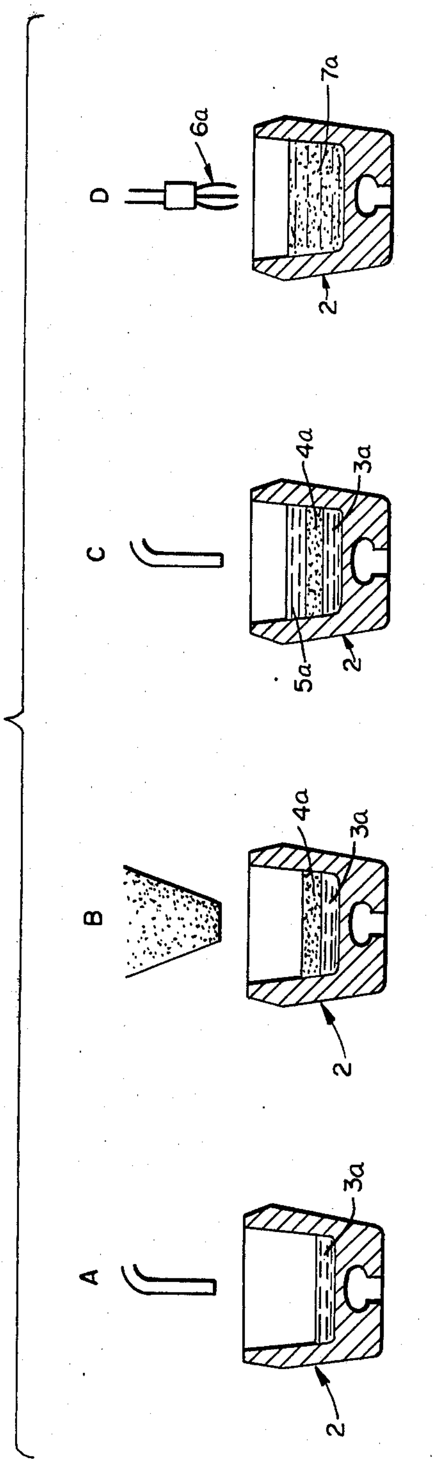
FIG. 2 shows four corresponding steps for preparing the mortar within the cap portion.

The same procedure is simultaneously carried out with respect to insulator cap 2, FIG. 2, where a precisely measured quantity of water 3*a*, which may likewise be ⅓ of the total quantity of water, is added. At B the total measured amount of cement 4*a* is added. At C the remaining ⅔ of water 5*a* is deposited, and at station D mixer 6*a* is lowered into cavity of the cap to rapidly and thoroughly mix the ingredients.

The body 1 and its cap 2, each containing its charge of mortar, are immediately transferred to a station, not shown, where the cap is located in final assembled relation over the body portion, and the metallic stem not shown, is introduced into the freshly mixed mortar within body 1, in proper assembled relation therewith.

While only one station D of vibration or other manner of mixing is shown, there may be two sequential such stations wherein the mixing begun at the first station D, is completed at a second and subsequent station by vibration means like item 6. The frequency of vibration may, for example, be of the order of 8000 per minute. The mortar within the cavity of the body portion 1 may be composed of about 8 grams of water and 40 grams of cement, while that used to secure together the cap and insulator body may consist of about 18 grams of water and 50 grams of cement. By the invention, using a continuous production line procedure wherein accurately-measured quantities of water and cement are automatically introduced into each cavity, as by a chain or belt type conveyor, it is possible to assemble 500 complete insulator units per hour, each containing a known precise quantity of homogenous, freshly-mixed mortar of the same proportions of ingredients and each assembled within less than 2 minutes following mixture of the mortar.

Table 1 following gives the composition of an aluminous type cement suitable for carrying out the inventive method, and identified as H. A. 527. Also given are the compositions of two high-strength Portland type cements, identified respectively as A.R.I. (Italian), and CPA 400 (Lafarge), all percentages being by weight.

TABLE 1

| | H.A. 527 | A.R.I. | CPA 400 |
|---|---|---|---|
| $Al_2O_3$ | 37.87 | 3.66 | 4.10 |
| CaO | 37.48 | 65.90 | 63.20 |
| $Fe_2O_3$ | 9.82 | 2.96 | 3.60 |
| FeO | 5.69 | — | — |
| $SiO_2$ | 4.01 | 20.90 | 19.80 |
| $SO_3$ | 0.09 | 2.82 | 3.50 |
| $Na_2O$ | 0.05 | 0.31 | 0.30 |
| $K_2O$ | 0.14 | 0.57 | 2.10 |
| L.O.I. | 0.68 | 1.79 | 1.30 |
| MgO | 1.20 | 1.00 | 1.00 |
| $Mn_2O$ | | | |
| $Mn_3O_4$ | 0.17 | 0.04 | 1.00 |

Table 2 following gives the results of tests of the aluminous type cement identified in Table 1, for three water/cement ratios, and shows the crushing strength under conditions (*a*) wherein the mortar crystallized in a cubical system at a temperature of 50° C. and (*b*) wherein the mortar crystallized in a hexagonal system at a controlled temperature of 18° C. The values given were obtained by testing the resistance to crushing of cubes of mortar of the aluminous type cement, 1/2 inch (12.7 mm) on a side, having water/cement ratios of 0.20, 0.23, and 0.25, respectively and fully cured at the temperatures indicated. All test specimans were formed by placing the mortar in brass molds and maintaining them under wet linen for one day. The cubes were then removed from the molds and maintained in one case, under water at 18° C in order to effect hexagonal crystallization and in the other case at 50° C. to effect cubical crystallization. In each instance the results stated are the average of six cubes of each type, tested after 28 days of maintenance under the controlled temperatures indicated.

TABLE 2

| Average Temp. of Water Used to Maintain Corresponding Temp. of Test Specimen | Resistance to Crushing in PSI of Specimen Having Water/Cement Ratio of | | |
|---|---|---|---|
| | 0.20 | 0.23 | 0.25 |
| 18° C. | 19,000 | 21,050 | 20,100 |
| 50° C. | 20,100 | 17,850 | 9,800 |

Table 2 shows that when the mortar sets in a hexagonal system of crystallization, the water/cement ratio may be materially increased without a decrease in strength thereof. In fact the strength increases appreciably with increase in the W/C ratio. This is in decided contrast to the case where the mortar sets in a cubical system, as the table shows. Since, in the present invention it is possible to closely control the temperature of the insulators during setting or hardening of the mortar used to assemble the parts thereof, and since increase in the water content of the mortar greatly facilitates mixing and correct emplacement thereof in the cap and body portion of the insulators, the advantage afforded by the invention is clear.

Table 3 following gives the results of actual tests of insulators assembled by mixing the mortar in accordance with the present invention, as compared with like tests of insulators prepared by mixing the mortar in the conventional or prior art way as previously explained. In each instance each insulator was subjected to a tension of 8.2 tons after having been subjected to five cycles of 20 minutes each, first immersed in water at 80° C., followed by immersion for 20 minutes in water at 10° C.

TABLE 3

| | |
|---|---|
| A. PRIOR ART PROCEDURE | |
| Stem of Insulator Pulled Out at Tension Tonnage of | |
| | 10,100 |
| | 10,200 |
| | 10,750 |
| | 11,050 |
| | 11,950 |
| | 12,150 |
| Ball Socket Broke at Tension Tonnage of | |
| | 10,950 |
| | 11,700 |
| | 11,800 |
| | 11,900 |
| | 12,150 (2 tests) |
| | 12,300 |
| B. PRESENT INVENTION | |
| Stem of Insulator Pulled Out at Tension Tonnage of | |
| | 11,650 |
| | 12,100 |
| | 12,150 |
| | 12,250 |
| | 12,350 |
| | 12,500 |
| | 12,600 |
| | 12,700 |
| | 12,750 |
| | 13,100 |
| Ball Socket Broke at Tension Tonnage of | |
| | 11,650 |
| | 11,900 |
| | 12,400 (2 tests) |
| | 12,600 |
| | 12,850 |

Stem Broke (1 test) at 12,500 tons tension Comparison of the test data of Table 3 shows that with insulators prepared in accordance with the present invention the stems pulled out at tonnages of between 11,650 and 13,100, the average being 12,400 tons. On the other hand, in insulators of the same identical construction but prepared with mortar mixed by prior art procedures, the stems pulled out at tonnages between 10,100 and 12,150, the average being 11,030 tons. Thus, mixing of the mortar by the present inventive method augmented the tensile strength of the insulators by an average of 1,370 tons, or 12.4%.

In amplification of the comment previously made, regarding radiophonic perturbations, it is explained that insulators of the involved type have capacitance which injects high frequency oscillations into the line. The line acts as an antenna which, in effect, emits parasitic waves of radio frequency. The emanations may also create corona effects which increase with the effective capacitance. In particular if the level of the cement is above the rim of the cap, excessive corona or flash-over may occur between the surface of the cement in the cap, and its base. Thus it is important to maintain the cement at the lowest possible level within the cap, consistent with the required tensile strength. The invention enables assures the uniform and optimum level of cement within the cap for all insulators because of the precision with which each charge of cement to be mixed may be measured, dispensed and mixed in each cap and body portion cavity.

The foregoing disclosure is to be taken in an illustrative rather than a limiting sense, as numerous variations and modifications will readily occur to those skilled in the art, after a study of the disclosure.

I claim:

1. The method of cementing a hollow cap of an electrical insulator, to and exteriorly about the body portion of the insulator, comprising, adding measured quantities of water and cement into the cap, mixing the water and cement into mortar within the cap, and bringing the cap and body portion into final assembled relation with the body portion within the mortar.

2. The method of claim 1, the cap and body portion being assembled together immediately following mixture of the mortar.

3. The method of claim 1, a first portion only of water being added initially, followed in sequence by the measured quantity of cement and remaining portion of water, in the order mentioned.

4. The method of claim 3, said first portion of water being about ⅓ of the total measured quantity.

5. The method of claim 1, and essentially simultaneously with addition of water and cement to the cap, adding measured quantities of water and cement to the hollow body portion of the insulator, mixing the water and cement within the body portion essentially simultaneously with mixing of the water and cement in the cap, and completing the assembly as aforesaid by immersing one end of a stem into the mixed mortar within the body portion.

6. The method of claim 5, first portions of the measured quantities of water only being added into the cap and body portion, followed in sequence by the respective measured quantities of cement and remaining portions of water.

7. The method of claim 6, said first portions each being about ⅓ of the total measured quantities of water added to the cap and body portion, respectively.

8. The method of claim 1, the cement being of an aluminous type, and curing the mortar while maintaining the same at a temperature not greater than about 23° C., to thereby effect hexagonal type crystallization of the mortar.

9. The method of claim 8, said temperature being about 18° C.

* * * * *